United States Patent [19]

Hara

[11] Patent Number: 4,903,063
[45] Date of Patent: Feb. 20, 1990

[54] INSTANT FILM PACK

[75] Inventor: Yoshio Hara, Kanagawa, Japan

[73] Assignee: Fuji Photo Film Co., Ltd., Kanagawa, Japan

[21] Appl. No.: 258,352

[22] Filed: Oct. 17, 1988

[30] Foreign Application Priority Data

Oct. 16, 1987 [JP] Japan .............................. 62-158316[U]

[51] Int. Cl.⁴ ........................ G03B 17/26; G03B 17/52
[52] U.S. Cl. ..................................... 354/277; 354/86; 354/283
[58] Field of Search .................. 354/86, 276, 277, 283

[56] References Cited

U.S. PATENT DOCUMENTS

| | | | |
|---|---|---|---|
| 3,165,040 | 1/1965 | Hamilton | 354/86 |
| 3,607,283 | 9/1971 | Gold | 354/276 |
| 3,922,700 | 11/1975 | Asano et al. | 354/276 |
| 3,930,264 | 12/1975 | Asano | 354/277 |
| 3,943,535 | 3/1976 | Asano | 354/277 |
| 3,999,200 | 12/1976 | Goto | 354/277 |
| 4,827,297 | 5/1989 | Douglas | 354/276 |

Primary Examiner—A. A. Mathews
Attorney, Agent, or Firm—Sughrue, Mion, Zinn, Macpeak & Seas

[57] ABSTRACT

An instant film pack for containing therein a stack of integral type instant film units is provided with an exposure frame defined by an opening formed in a top wall of the film pack. A film unit exit slot is formed in a front wall of the film pack through which exposed instant film units are ejected one by one. A protective cover sheet having a rearwardly and outwardly inclined and tapered leading edge which is removably disposed in the film pack for protecting the foremost film unit from being exposed to light, and a light blocking member covering the film unit exit slot to block light entering inside the film pack therethrough which is split by the inclined and tapered leading edge of the protective cover sheet.

14 Claims, 3 Drawing Sheets

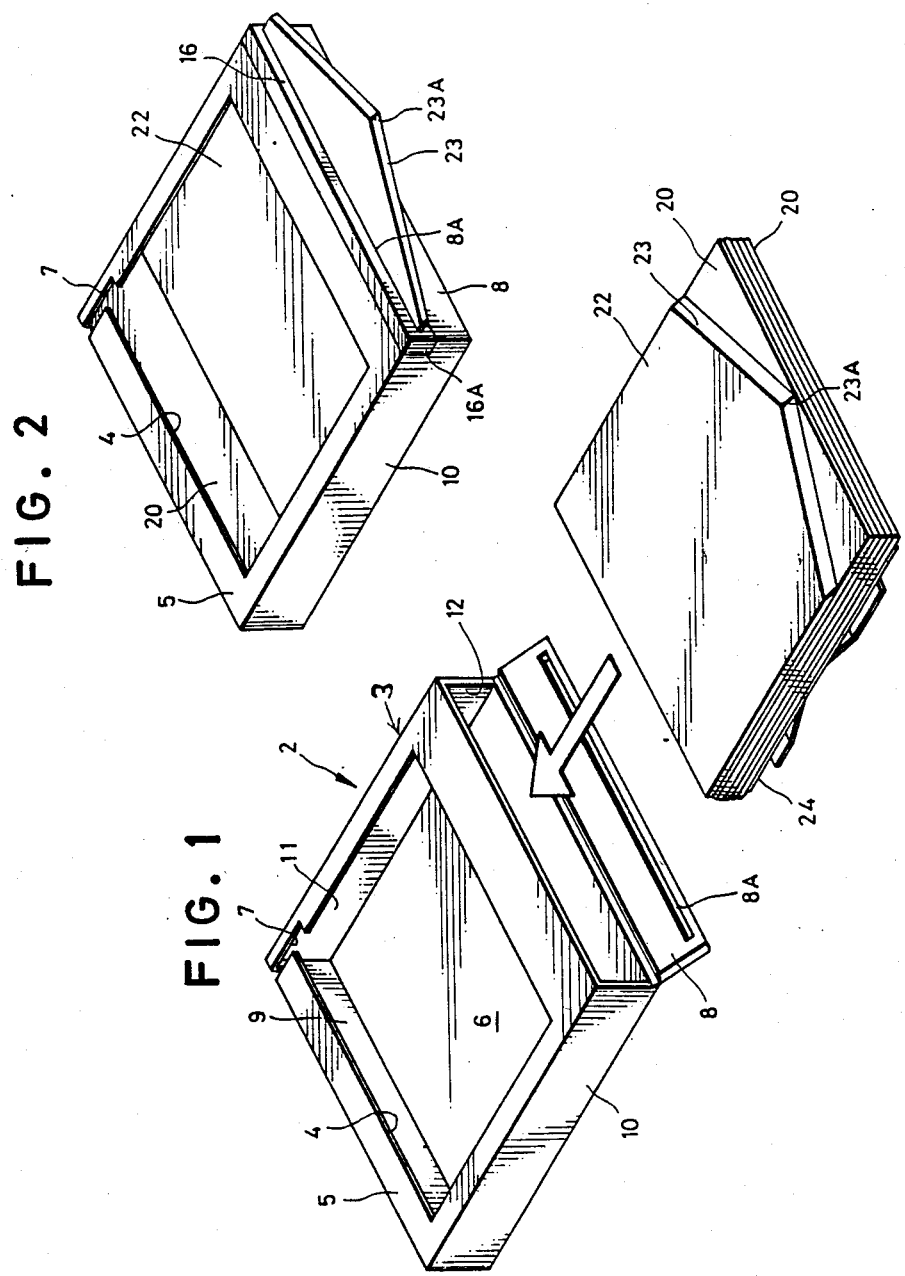

INSTANT FILM PACK

BACKGROUND OF THE INVENTION

The present invention relates to an instant film pack for containing a stack of integral or mono-sheet type instant film units.

As is well known in the instant photographic art, in integral or mono-sheet type diffusion transfer film units, an image-receiving sheet is assembled with a negative or photosensitive sheet in a single unit. The integral type instant film unit is provided, at one end, with a rupturable pod containing a developing reagent and at the opposite end with a trapping member for trapping and hardening excess developing reagent. A number of such integral type instant film units are stacked in a film pack.

This instant film pack is formed with an integral type instant film unit exit slot through which exposed film units are ejected one by one. For film safety, the film exit slot of the instant film pack is covered by a member opaque to light to block light entering into the instant film pack before the instant film pack is loaded in an instant camera. Used heretofore to prevent the integral type instant film units in the instant film pack from being exposed to ambient light or stray light is a light opaque member to cover over the film unit exit slot. In particular, a strip-like flexible light opaque member is attached to a top wall of the instant film pack along its one side and is releasably held by a thin plastic holding strip member heat-welded to a front wall of the instant film pack along its opposite side to cover a film unit exit slot formed in the front wall.

Such a light blocking member is broken by a protective cover sheet in the instant film pack which is ejected from the instant film pack and breaks the light blocking member to open the film unit exit slot. As is well known in the art, there is provided in the instant film pack a spring-supported pressure plate made of, for example, a thin steel sheet which presses the stack of integral type instant film pack so as to place the foremost integral type instant film unit in the focal plane of the instant camera and to maintain it flat.

A problem associated with the manufacturing of such instant film packs is that at least two steps are required to apply the light blocking member to the instant film pack, namely a step to adhere one side of the light blocking member to the top wall of the instant film pack and a step to heat-weld the holding strip member to the front wall of the instant film pack so as to releasably hold the opposite side of the light blocking member. The necessity of such two steps increases the manufacturing cost of the instant film packs and decreases the manufacturing efficiency of the instant film packs.

OBJECT OF THE INVENTION

It is, therefore, an object of the present invention to provide an instant film pack for integral or mono-sheet type instant film units in which the film unit exit slot is securely light-tightly closed, is easily split and which can be manufactured at low cost.

SUMMARY OF THE INVENTION

The above and other objects of the present invention are achieved by providing an instant film pack (hereinafter referred to as a film pack) for containing therein a stack of integral or mono-sheet type instant film units (hereinafter referred to as film units). which is provided with an exposure frame defined by an opening formed in a top wall of the film pack, a film unit exit slot formed in a front wall of the film pack through which exposed instant film units are ejected one by one, a protective cover sheet having an inclined tapered leading edge which is removably disposed in the film pack for protecting the foremost film unit from being exposed to light, and a light blocking member covering the film unit exit slot to block light entering the film pack therethrough and which is breakable by the inclined tapered leading edge of the protective cover sheet.

By virtue of the inclined tapered leading edge of the protective cover sheet, the light blocking member, which is breakable by the leading edge of the protective cover sheet, can be lightly welded to the film pack, resulting in simplified manufacturing steps in the process of completing film packs.

BRIEF DESCRIPTION OF THE DRAWINGS

The above and other objects and features of the present invention will become apparent from the following description taken in conjunction with the preferred embodiments thereof with reference to the accompanying drawings in which same reference numerals denote same or like elements throughout several views thereof and wherein:

FIG. 1 is a perspective, exploded view of a film pack according to a preferred embodiment of the present invention;

FIG. 2 is a perspective view of a film pack in which a protective cover sheet is partially withdrawn therefrom;

DETAILED DESCRIPTION OF THE INVENTION

Figure 3:
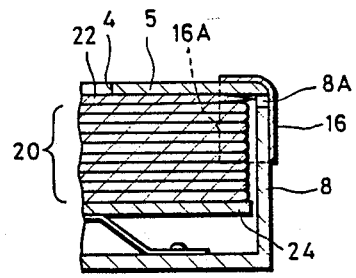
FIG. 3 is an enlarged cross sectional view of a front part of the film pack of FIG. 2.

Referring now to FIG. 1 illustrating an instant film pack assembly according to the present invention in an exploded fashion, a generally box-shaped film pack 2 preferably made of plastic materials such as polystyrene is formed with an exposure frame 3 defined by a square opening 4 formed in a top wall 5 thereof. A front wall 8 of the film pack, while rear and side walls 9, 10 and 11 are rigidly formed integral with the top and bottom walls 5 and 6, is formed integrally with but flexibly hinged to the bottom wall 6. This front wall 8 is provided with a horizontal thin film unit exit slot 8A. The film pack 2 is further formed with a slot 7 opening in the top and rear walls 5 and 9 of the film pack 2 which allows a film unit pick-up claw 38 (see FIG. 4) to move back and forth therein so as to force out the foremost film unit in the film pack 2.

In the film pack 2, a plurality, for example ten sheets, of film units 20 are received in the film pack 2 in a stacked fashion and a protective cover sheet 22 which is opaque to light is placed on the top of the foremost film unit 20 in the film pack 2. As is clearly shown in FIGS. 1 and 2, the protective cover sheet 22 has a front edge 23 which is tapered downwardly and forwardly and is inclined at an angle outwardly from the center to each side with respect to a direction in which each film unit 20 is withdrawn from the film pack 2 on the opposite sides of the tip end 23A thereof to form an isosceles triangle. In order to press the protective cover sheet 22, or the foremost film unit 20 when the protective cover sheet 22 is removed, against the back of the exposure frame 3, there is a spring-supported pressure plate 24 in the film pack 2 underlying the stack of film units 20. After encasing a stack of the film units 20 with its associated elements in the film pack 2, the front wall 8 is pivoted against and fixed to the front edges of the top, bottom and side walls 5, 6, 10 an 11 by, for example, heat welding to close the front opening 12 light-tightly.

As is best seen in FIG. 3, a blocking member 16 is adhered to the film pack 2 along its sides to close over the film unit exit slot 8A light-tightly. In particular, the blocking member 16 is a flexible strip having a length larger than the width of the film pack 2. The upper side of the flexible strip blocking member 16 is adhered to the top wall 5 and the strip is bent down over the front wall 8. The lower side of the flexible strip blocking member 16 is adhered to the front wall 8 and the opposite ends 16A of the flexible strip are bent back and are adhered to the side walls 10 and 11 respectively. This flexible strip-like blocking member 16 is preferably made of a thin sheet material easily split in a lengthwise direction thereof by the tapered and inclined edge 23 of the protective cover sheet 22 such as plastic thin films, papers, cellophane tapes, aluminum films or the like which are opaque to light. It may be effective to emboss front part of the blocking member 16 to be certain of splitting the blocking member by the leading edge 23 of the protective cover sheet 22. If employing plastic materials for the blocking member 16, plastic films having a uniaxial orientation are used and attached with the direction of the uniaxial orientation parallel with the film exit slot 8A.

For easy splitting, the leading edge 23 of the protective cover sheet 22 takes the form of an isosceles triangle having an apex angle of approximately 130 degrees.

Figure 4:
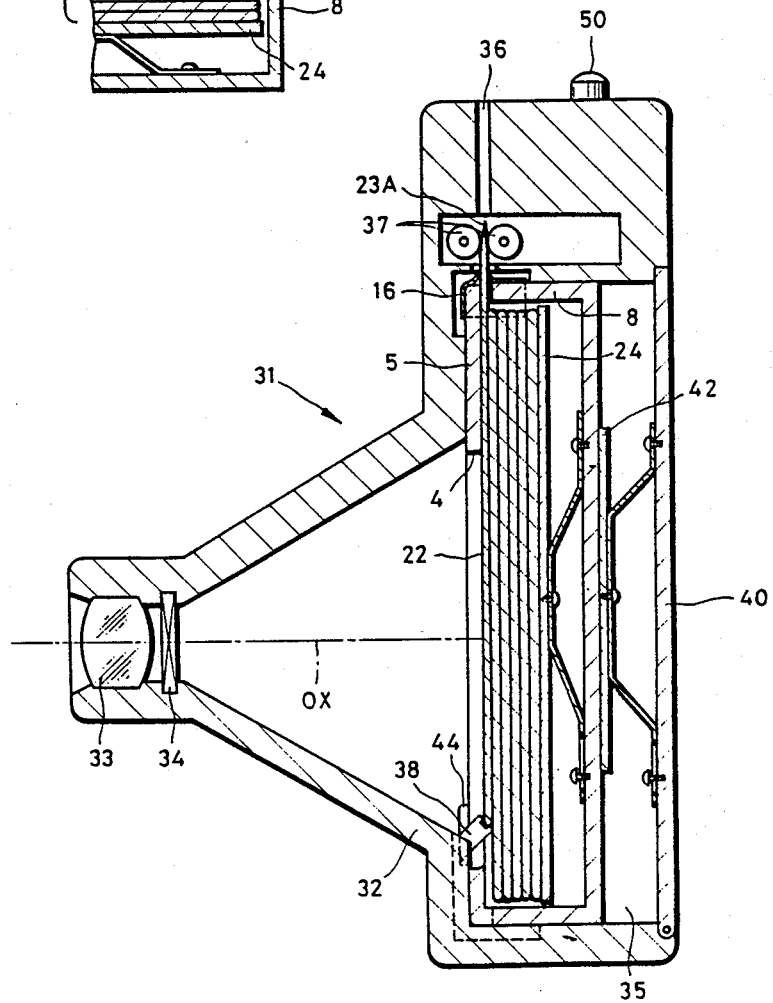
FIG. 4 is a cross sectional view of an instant camera loaded with the film pack of FIG. 2.

The film pack 2 containing a stack of film units in a light-tight fashion is loaded in an instant camera 31 as shown in FIG. 4. As shown, the instant camera 31 has a camera housing 32 with a taking lens 33 and a shutter unit 34 including an aperture. Behind the shutter unit 34, there is a film pack receiving chamber 35 with a back cover 40. After loading the film pack 2 into the film pack receiving chamber 35 of the camera housing 32, the back cover 40 is manually closed so as to maintain the inside of the camera housing 32 light-tight. The back cover 40 is provided with a spring-supported pressure plate 42 attached to the inner surface thereof. Owing to the spring-supported pressure ,late 42, the film pack 2 is urged in the direction parallel to the optical axis OX of the taking lens 33, so that the exposure frame 4 of the film pack 2 is always pressed against the inner surface of the front wall of the film pack receiving chamber 35 of the camera housing 32.

The camera housing 32 is provided with a film outlet slot 36 and a pair of processing rollers 37 adjacent to the camera film exit slot 36. The processing rollers 37 are operationally coupled to a motor (not shown) through a well known gear train disposed in the camera housing 32. The camera housing 32 is further provided with the film unit pick-up claw 38 which, as is well known to those skilled in the art, is operationally coupled to the gear train to move in a space 44 in the camera housing 32 and extends into the slot 7 formed in the film pack 2 so as to engage the rear edge of the protective cover sheet 22 or the foremost film unit 20 if there is no protective cover sheet 22 in the film pack 2.

When depressing shutter button 50 after loading a new film pack 2 in the camera housing 32 and closing the back cover 40, the motor is actuated to move the film unit pick-up claw 38 so as to expel the protective cover sheet 22. With the expelling of the protective cover sheet 22, the sharp, tip end 23A of the inclined tapered leading edge 23 of the protective cover sheet 22 approaches and enters into the film unit exit slot 8A in the front wall 8 of the film pack 2 and, then, pierces the blocking member 16. As the film unit pick-up claw 38 continuously expels the protective cover sheet 22, the inclined tapered leading edge 23 of the protective sheet 22 splits the blocking member 16 in the lengthwise direction. When the film pick-up claw 38 thus expels the protective cover sheet 22, the pair of processing roller 37 are rotated and grasps the leading end of the protective cover sheet 22 therebetween. Because the processing rollers 37 continuously rotate, the processing rollers 37 then expel the protective cover sheet 22 through the film outlet slot 36. Thus, the blocking member 16 is broken to open film exit slot 8A.

After delivering the protective cover sheet 22 out of the instant camera 31, the motor stops to position the film unit pick-up claw 38 in its initial position. As soon as the protective cover sheet 22 ,s delivered out of the instant camera 31, the spring-supported pressure plate 24 presses the stack of film units toward the lens along the optical axis OX thereof, thereby pressing the foremost film unit 20 against the front exposure frame 4 of the film pack 2.

Every time the shutter release button is depressed to make an exposure for the foremost film unit 20, the shutter is operated in a well known manner. Immediately after the exposure of the foremost film unit 20, the motor is started again to actuate the film unit pick-up claw 38 to expel the foremost film unit 20 toward the processing rollers 37. The pair of processing rollers 37 grasps the foremost film unit 20 therebetween and expels it through the film outlet slot 36, applying pressure to the same. When the leading end of the film unit 20 passes between the processing rollers 37, a pod containing developing reagent attached to the end of the film unit 20 is ruptured to release a developing reagent between the image receiving and photosensitive sheets of the film unit 20. As the film unit 20 passes through the processing rollers 37, the released developing reagent is spread and distributed in a uniform layer between the image receiving and photosensitive sheets. A final image is formed on the image receiving sheet after the lapse of a predetermined number of seconds. After delivering the first film unit 20 out of the instant camera 31, the motor stops to position the film unit pick-up claw 38 in its initial position. As soon as the first film unit 20 is delivered out of the instant camera 31 the spring-supported pressure plate 24 presses the stack of film units 20 toward the lens along the optical axis OX thereof, thereby pressing the foremost film unit 20 against the front exposure frame 4 of the film pack 2.

Figure 5:
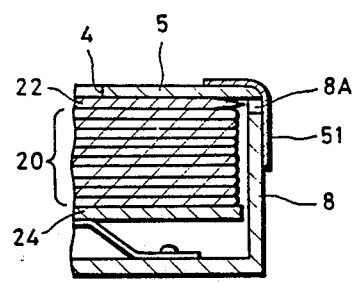
FIG. 5 is a sectional view similar to FIG. 3 of a front part of a film pack, according to another preferred embodiment of the present invention.
Figure 6:
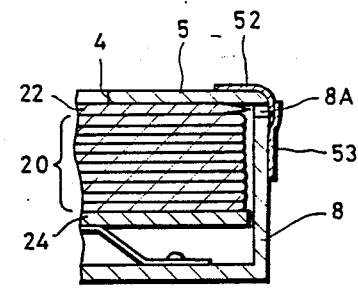
FIG. 6 is a sectional view similar to FIG. 3 of a front part of a film pack, according to still another preferred embodiment of the present invention.

The blocking member to close the exit slot 8A in the front wall of the film pack 2 may be formed of different shapes. For example, as is shown in FIG. 5, a blocking member 51 is provided, having a length equal to or shorter than the width of the film pack 2 and is heat-welded to the film pack 2 along its upper and lower sides to close the exit slot 8A formed in the front wall 8 of the film pack 2. Alternatively, as is shown in FIG. 6, dual upper and lower blocking members 52 and 53 having confronting edges overlapped may be used. These upper and lower blocking members 52 and 53 are heat-welded to the top wall 5 and the front wall 8 of the film pack 2, respectively and are weekly heat-welded to each other at the overlap.

Figure 7:
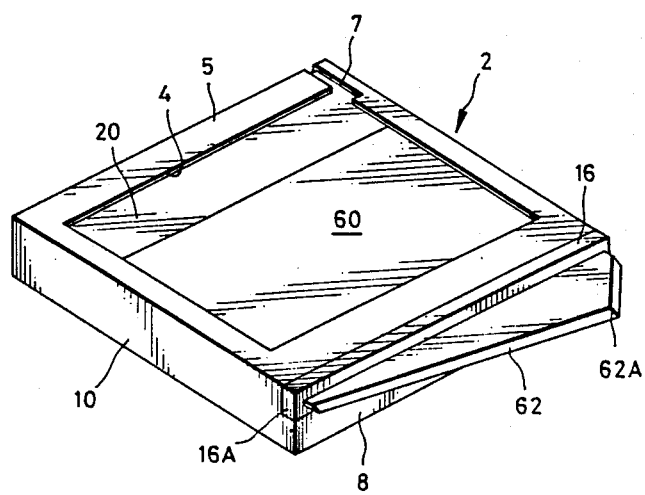
FIG. 7 is a perspective view similar to FIG. 2 of a film pack according to yet another preferred embodiment of the present invention.

Referring to FIG. 7, shown therein is a film pack according to another preferred embodiment of the present invention. Since the film pack shown in FIG. 7 is the same in construction as that of FIG. 1 excepting the shape of the protective cover sheet, the following description will be directed only to the protective cover sheet. As shown, a protective cover sheet 60 is provided having a leading edge 62 which is tapered downwardly and forwardly and inclined to opposite sides of a tip end 62A offset laterally from the center of the leading edge 62.

The experimental results of dynamical and optical effects of the blocking members made of the following materials A. B. C and D of the film pack 2 with the protective cover sheet 22 having an open angle of approximately 130° shown in FIG. 1 is summarized in TABLE I.

TABLE I

| Material | Light Blocking | Splitting Force | Activity |
| --- | --- | --- | --- |
| A | Good | 500 kg | Good |
| B | Good | 800 kg | Good |
| C | Good | 1200 kg | Good |
| D | Good | 1500 kg | Good |

Material A: A black-printed aluminum film of 0.015 mm thickness with one surface coated with a 0.02 mm thick layer of adhesive;
Material B: A black-printed aluminum film of 0.007 mm thickness laminated with a #300 cellophane film with one surface coated with a 0.02 mm thick layer of adhesive;
Material C: A black-printed aluminum film of 0.007 mm thickness laminated with a #300 cellophane film and a 0.1 = 018 mm thick polyethylene film having a uniaxial orientation with one surface coated with a .0.02 mm thick layer of adhesive; and
Material D: A black-printed aluminum film of 0.007 mm thickness laminated with a polyethylene terephthalate film having perforations in the lengthwise direction and a 0.018 mm thick polyethylene film having a uniaxial orientation with one surface coated with a 0.02 mm thick layer of adhesive.

In TABLE I, the materials are categorized as "good" in light blocking effect when no film units 20 in the film pack 2 are fogged after having been left for five minutes under $10^6 lx$ and in dynamic activity when all film units 20 can be smoothly withdrawn out from the film pack 2. "Splitting force" is the force required for the protective cover sheet 22 to split the blocking members.

Although the present invention has been fully described by way of the preferred embodiments thereof with reference to the accompanying drawings, it is to be noted that various changes and modifications are apparent to those skilled in the art. Therefore, unless otherwise, such changes and modifications depart from the scope of the present invention, they may be construed as included therein.

What is claimed is:

1. An instant film pack for containing and removably holding a plurality of integral type instant film units in a stack comprising:

a parallelpipedal housing having a flat top wall with a film exposure aperture therein and a front wall having a film unit exit slot therein through which each of said elongated film units is withdrawn after exposure:

a light blocking member attached to said film pack to close off said film unit exit slot from light: and a protective cover sheet removably disposed over the foremost one of said stack of film units in said film pack proximate to said film unit exit slot to isolate said foremost film unit to light and having a leading edge inclined at an angle laterally outwardly and rearwardly towards at least one side from a part on the leading edge relative to a direction in which each said film unit is withdrawn, whereby said inclined leading edge splits said light blocking member when said protective cover sheet is withdrawn by passing through said film unit exit slot.

2. An instant film pack as defined in claim 1. wherein said light blocking member is a plastic material sheet having an uniaxial orientation and attached to said instant film pack with the direction of orientation thereof in parallel with said film unit exit slot.

3. An instant film unit as defined in claim 1. wherein said light blocking member is a cellophane sheet.

4. An instant film pack as defined in claim 1, wherein said light blocking member is a printed black aluminum film base.

5. An instant film unit as defined in claim 4, wherein said light blocking member black-printed aluminum film base is laminated with a cellophane film.

6. An instant film pack as defined in claim 4, wherein said light blocking member black-printed aluminum film base has laminated thereto a cellophane film and a polyethylene film having a uniaxial orientation.

7. An instant film pack as defined in claim 4, wherein said light blocking member aluminum film base has laminated thereto a polyethylene terephthalate film having perforations in the lengthwise direction and a 0.018 mm thick polyethylene film having a uniaxial orientation.

8. An instant film pack as defined in claim 1, wherein said light blocking member is an embossed plastic film having a uniaxial orientation.

9. An instant film pack as defined in any one of said claim 1, wherein said light blocking member comprises two edge confronting sheets weakly heat-welded to each other at said confronting edges.

10. An instant film pack as defined in claim 1, wherein said leading edge of said protective cover sheet tapers forwardly in the direction of protective cover sheet extraction.

11. An instant film pack as defined in claim 10, wherein said protective cover sheet leading edge has two sides inclined oppositely from a tip end intermediate opposite sides of said protective cover.

12. An instant film pack as defined in claim 11 wherein said two sides of said leading edge of said protective cover sheet intersect at said tip end at an angle approximately 130°.

13. An instant film unit as defined in claim 11, wherein said tip end is at the center of said leading edge of said protective cover sheet.

14. An instant film pack as defined in claim 11, wherein said tip end is laterally offset from the center of said leading edge of said protective cover sheet.

* * * * *